United States Patent Office 3,123,526
Patented Mar. 3, 1964

3,123,526
FUNGICIDAL COMPOSITIONS AND METHODS EMPLOYING 2,3,5,10-TETRAHYDRO-3,5,10-TRIOXONAPHTHALINO - [2,3-b] - OXAZINES, THIAZINES AND PIPERAZINES
Anton Wagner, Walther Beck, and Alfred Diskus, Linz, Austria, assignors to Osterreichische Stickstoffwerke Aktiengesellschaft, Linz, Austria
No Drawing. Filed Mar. 24, 1961, Ser. No. 97,990
Claims priority, application Austria Mar. 26, 1960
9 Claims. (Cl. 167—33)

This invention relates to anti-fungal compositions. More particularly, the invention relates to compositions containing as the active anti-fungal constituent one or more of the compounds having a general formula:

(I)
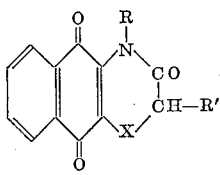

wherein X is an oxygen atom, a sulfur atom or the group N—R″, and R, R′ and R″ are the same or different, each representing hydrogen, alkyl, preferably lower alkyl, or cycloalkyl, preferably up to 6 carbon atoms.

It has been found that compositions containing compounds of Formula I destroy or inhibit the growth of harmful fungi, particularly those found on plants and also those which infest wood, paper, glue or textiles.

The following compounds of Formula I are particularly illustrative of active compounds contemplated by this invention: 2,3,5,10-tetrahydro - 3,5,10 - trioxo-naphthalino-[2,3-b]-1,4-thiazine, 2-methyl-2,3,5,10-tetrahydro-3,5,10 - trioxo - naphthalino-[2,3-b]-1,4-oxazine, 4-ethyl-2,3,5,10-tetrahydro - 3,5,10 - trioxonaphthalino-[2,3-b]-thiazine, 2-cyclohexyl - 2,3,5,10 - tetrahydro-3,5,10-trioxo-naphthalino-[2,3-b] - 1,4 - thiazine, 4-ethyl-2,3,5,10-tetrahydro-3,5,10-trioxo-naphthalino-[2,3-b]-piperazine.

The active compounds of the anti-fungal compositions of this invention may be prepared according to the method of Fries et al., Berichte 56B, 1291–1304 (1923), Chem. Abstr. 17, 3334 (1923), by cyclizing, e.g. with acetic acid or other fatty acids, 1,4-naphthoquinone derivatives substituted by nitrogen-containing, oxygen-containing or sulfur-containing groups. Thus, for example, 4 - ethyl - 2,3,5,10 - tetrahydro-3,5,10-trioxo-naphthalino-[2,3-b]-1,4-thiazine is obtained from 2-carboxymethylthio - 3 - ethylamino-naphthoquinone-(1,4), and 2-methyl-2,3,5,10-tetrahydro - 3,5,10 - trioxo-naphthalino-[2,3-b]-1,4-oxazine is obtained from 2-(1-carboxyethoxy)-3-amino-naphthoquinone-(1,4).

The anti-fungal compositions of this invention may be used as spraying agents in the form of a solution, suspension or emulsion, or as a dusting agent. To form a composition which may be suspended in a liquid medium, one or more compounds of formula I are mixed with an inert carrier substance, such as talc, kaolin, or the like, and a wetting agent, such as, alkylaryl sulfonates, or alkylbenzene polyoxyethylene adducts. Emulsifiable preparations may be prepared by dissolving the active substance in an organic solvent, such as dimethylformamide, or the like, and adding, if desired, wetting agents, such as, sulfosuccinic acid esters. To the suspendable or emulsifiable composition may then be added water or other inert liquid. In addition to the carrier material and wetting agents, additional anti-fungal agents or other pest control substances may be added. In general, 5 to 80 parts, preferably 5 to 50 parts, by weight of active substance of Formula I per weight of total composition provide the results desired.

The following examples are illustrative of the invention:

EXAMPLE 1

21.6 g. of 2,3-dichloronaphthoquinone are suspended in 139.6 g. of ethyl alcohol and heated with 21.6 ml. of concentrated ammonia for five hours. The solid fractions precipitated in the reaction mixture after cooling are isolated. 19.3 g. of 2-chloro-3-aminonaphthoquinone are obtained, i.e. 98% of the theoretical. Melting point 198–200° C.

The 2-chloro-3-aminonaphthoquinone is suspended in 153 g. of alcohol, mixed with a solution of 23.1 g. of $Na_2S.9H_2O$ in water and boiled. The resulting solution of 2-mercapto-3-amino-naphthoquinone is reacted with 19.3 g. of chloroacetic acid and then mixed with hydrochloric acid to precipitate the resulting 2-carboxymethylthio-3-amino-naphthoquinone. After isolation and drying, 15.5 g. of this compound are obtained, i.e. 61% of the theoretical. Melting point 255–260° C.

These 15.5 g. of 2-carboxymethylthio-3-amino-naphthoquinone are suspended in glacial acetic acid and heated for thirty minutes under reflux. The solid product precipitated after cooling is isolated and dried. 10 g. of 2,3,5,10 - tetrahydro-3,5,10-trioxo-naphthalino-[2,3-b]-1,4-thiazine are obtained, i.e. 72% of the theoretical. Melting point 260° C. (decomposition).

EXAMPLE 2

By substituting equivalent proportions of methylamine or ethylamine for the ammonia in the first reaction of Example 1, 4-methyl- or 4-ethyl-2,3,5,10-tetrahydro-3,5,10-trioxo-naphthalino - [2,3-b] - 1,4 - thiazine, respectively, is obtained.

EXAMPLE 3

A fungicidal dust is prepared by intimately admixing 5 parts by weight of 4-ethyl-2,3,5,10-tetrahydro-3,5,10-trioxonaphthalino-[2,3-b]-1,4-thiazine with 95 parts by weight of talc. The mixture is dusted directly on the surface of the material to be protected by conventional dusting procedures.

EXAMPLE 4

A suspendable powder is prepared by thoroughly mixing 25 parts by weight of 2,3,5,10-tetrahydro-3,5,10-trioxo-naphthalino-[2,3-b]-1,4-thiazine with 2.5 parts by weight of oleic acid methyltauride and 22.5 parts by weight of kaolin. By suspending this powder in water in a ratio of 1 to 500, a suspension suitable for horticultural use is obtained.

*Inoculation Test*

An acetone solution of the active substance of known concentration is introduced into liquid agar culture media. In this way, culture media are made which contain the substance to be tested in certain concentrations, expressed in parts per million. After evaporation of the acetone and solidification of the culture medium, the plates are inoculated with an aqueous suspension of the spores of the fungus to be tested. In order to prevent any uneven separation of the spore suspension and ensure regular circular growth of the cultures, a small gauze disc starched with rice starch is placed on the culture medium before inoculation. The spore drop spreads over a standard area in this fabric. The area of growth after three days is measured with a planimeter and compared with the area of the fungus culture in the non-treated control, and the percentage of the fungus culture area in the control constituted by the fungus culture area in the test is indicated. The value "ED 50" determined graphically from this indicates the concentration of the active substance to be tested in parts per million of culture medium, with the use of which the area of the fungus culture is reduced to 50% of the extent reached by the controls. The higher the value ED 50, the lower the activity of the compound.

The results are given in the following table:

| Active Compound | ED 50 in p.p.m. | |
| --- | --- | --- |
| | Aspergillus niger | Oidium lactis |
| 2,3,5,10-tetrahydro-3,5,10-trioxo-naphthalino-[2,3-b]-1,4-thiazine | 1 | 1-2 |
| 4-methyl-2,3,5,10-tetrahydro-3,5,10-trioxo-napthalino-[2,3-b]-1,4-thiazine | 1 | 10 |
| 4-ethyl-2,3,5,10-tetrahydro-3,5,10-trioxo-naphthalino-[2,3-b]-1,4-thiazine | 2 | 6 |

What is claimed is:

1. An anti-fungal composition comprising 4-ethyl-2,3,5,10-tetrahydro - 3,5,10 - trioxo-naphthalino-[2,3-b]-1,4-thiazine as an essential active ingredient and an inert carrier.

2. An anti-fungal composition comprising 4-methyl-2,3,5,10 - tetrahydro - 3,5,10 - trioxo-naphthalino-[2,3-b]-1,4-thiazine as an essential active ingredient and an inert carrier.

3. An anti-fungal composition consisting essentially of 5 parts by weight of 4-ethyl-2,3,5,10-tetrahydro-3,5,10-trioxo-naphthalino-[2,3-b]-1,4-thiazine and 95 parts by weight of talc.

4. An anti-fungal composition in the form of a suspendable powder consisting essentially of 25 parts by weight of 2,3,5,10-tetrahydro-3,5,10-trioxo-naphthalino-[2,3-b]-1,4-thiazine, 2.5 parts by weight of oleic acid methyltauride and 22.5 parts by weight of kaolin.

5. An anti-fungal composition comprising an aqueous suspension of the powder of claim 4.

6. A method of inhibiting the growth of fungi which comprises treating the fungi with an anti-fungal composition comprising as an essential active ingredient a compound selected from the group having the formula:

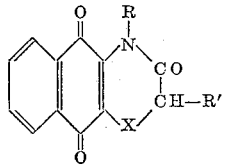

wherein X is selected from the group consisting of oxygen, sulfur and N—R″, R, R′ and R″ are independently selected from the group consisting of hydrogen, lower alkyl and cyclohexyl and mixtures of compounds of said formula, and an inert carrier.

7. A method of inhibiting the growth of fungi which comprises treating the fungi with a composition as defined in claim 2.

8. A method of inhibiting the growth of fungi which comprises treating the fungi with a composition as defined in claim 3.

9. A method of inhibiting the growth of fungi which comprises treating the fungi with a composition as defined in claim 5.

References Cited in the file of this patent

Fries et al., Chem. Abstr. 17, page 3334 (1923).

Hoover et al.: J. Am. Chem. Soc. 76, pages 4148–52 (1954).